April 18, 1967  H. DARR  3,314,191

FROST PREVENTION DEVICE

Filed Dec. 27, 1965

INVENTOR.
HERMAN DARR
BY
Woodhams, Blanchard & Flynn
ATTORNEYS

United States Patent Office 3,314,191
Patented Apr. 18, 1967

3,314,191
FROST PREVENTION DEVICE
Herman Darr, Columbia Township, Van Buren County,
Mich. (Rte. 1, Box 90, Grand Junction, Mich. 49056)
Filed Dec. 27, 1965, Ser. No. 516,579
3 Claims. (Cl. 47—2)

This invention relates in general to a system for preventing frost damage and, more particularly, to a hydraulically actuated fan structure capable of attachment to the riser pipe of an irrigation system for effecting a flow of air across the surface of the ground near said pipe.

Persons who have knowledge of farming, have become acquainted with the damage which frost can produce on certain types of crops when the temperature approaches or drops below freezing and there is little or no air movement close to the crops. In order to avoid such frost damage, many types of structures and equipment have been developed. Moreover, it is well known that crop damage will be minimized and sometimes prevented merely by spraying the crops with water, particularly where the temperature is only slightly below the danger point. However, to make this water most effective, there should be at least some air movement adjacent the crops so that such air will be warmed up by the water discharged from the sprayers. This air movement must be reasonably substantial and there must be no pockets around the field in which the air can remain substantially motionless.

Heretofore, attempts have been made to place a few large fans near a field containing crops which would be damaged by frost, but it has been found that very little coverage could be obtained in this manner. It has been much too costly and/or impractical to place existing types of individual fans around such fields and, therefore, the use of air moving devices in conjunction with spraying systems has not been particularly successful.

Accordingly, a primary object of this invention has been the provision of air moving devices which could be coupled closely with the water distributing devices and supplied in sufficiently plentiful numbers that uniform, mass air movement across the crops to be protected can be achieved.

A further object of this invention has been the provision of an air moving device, as aforesaid, which can be operated from an inexpensive and readily available source of power, namely, water power, which devices are relatively inexpensive to manufacture, which are relatively easy to install, which require little or no maintenance, which require little power to operate and wherein the cost of such power is negligible.

A further object of this invention has been the provision of an air moving device which, when coupled with water spraying mechanisms, is capable of preventing frost damage at much lower temperatures than possible with previously known frost prevention devices which are economically feasible.

Other objects and purposes of this invention will become apparent to persons familiar with this type of equipment upon reading the following specification and examining the accompanying drawings, in which.

Figure 2:
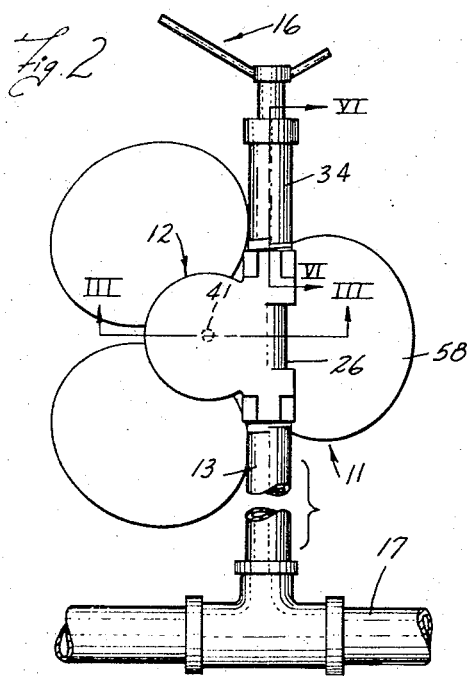
FIGURE 2 is a broken, side elevational view of one installation indicated by the cutting line II—II in FIGURE 1.

For convenience in description, the terms "upper," "lower" and words of similar import will have reference to the device of the invention as appearing in FIGURE 2. The terms "inner," "outer" and derivatives thereof will have reference to the geometric center of said device.

*General construction*

The objects and purposes of this invention, including those set forth above, have been met by providing a plurality of hydraulically driven fan units which are connectible to and between the spray nozzle and the upper end of the riser pipe on an irrigation or sprinkling system. The hydraulic motor has a vane-type rotor with a shaft which is connected to the axial flow fan wheel. The rotational axis of the fan wheel shaft is preferably substantially horizontal and the spray nozzle preferably rotates around a substantially vertical axis. It is important that resistance to liquid flow through the motor and spray nozzle be minimized. That is, the outlet orifice from the hydraulic motor should be substantially larger than the inlet orifice and, the discharge opening in the spray nozzle should also be at least as large as and preferably larger than the inlet orifice on the hydraulic motor.

It has also been found essential to provide a plurality of the fan units at uniform intervals around the area to be protected and arranged so that they all urge the air movement in the same direction, which is preferably in the direction of the prevailing wind movement so that they will tend to augment even the slightest amount of air movement which may from time to time be available from natural sources.

*Detailed description*

Figure 1:
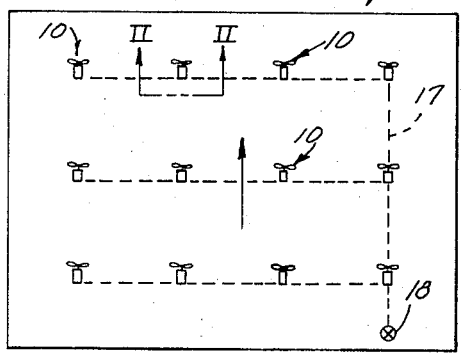
FIGURE 1 is a plan view of a plurality of the devices of the invention arranged in a pattern corresponding to their normal use for frost prevention.

The frost prevention device 10 of the invention (FIGURE 2) is comprised essentially of a fan assembly 11 including a hydraulic motor 12 which is mounted upon the upper end of the riser pipe 13 of a substantially conventional irrigating system 14 (FIGURE 1). Said device 10 (FIGURE 2) also includes a sprinkling head 16 which is connected to the outlet side of the hydraulic motor 12 and is preferably the type which rotates around a substantially vertical axis as it discharges water. The riser pipe 13 is connected to a supply line 17 by conventional fittings and said supply line is in turn connected to any source 18 of water under pressure as indicated in FIGURE 1.

Figure 3:
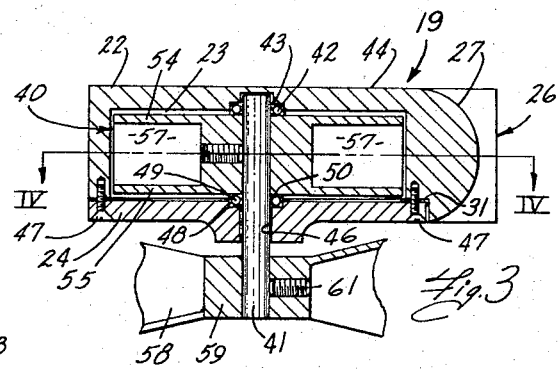
FIGURE 3 is a sectional view taken along the line III—III in FIGURE 2.
Figure 5:
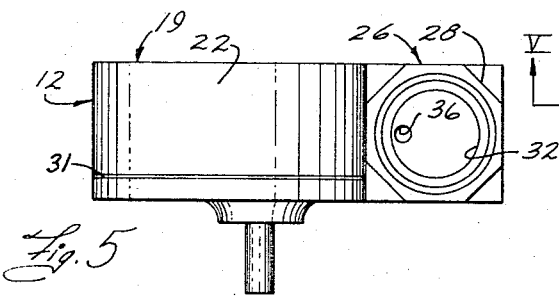
FIGURE 5 is an end elevational view of the inlet side of the hydraulic motor as viewed from the cutting line V—V in FIGURE 4.

The hydraulic motor 12 (FIGURE 5) includes a substantially cylindrical housing 19 having a cup-shaped portion 22 defining a substantially cylindrical recess 23 (FIGURE 3) which is covered by the cover plate 24. A connection portion 26 is integral with the side wall 27 of the cup-shaped portion 22 and includes a pair of fittings 28 and 29, which have internally threaded, and preferably substantially coaxial, openings 32 and 33, respectively, which extend into but not completely through the connection portion 26. The threads in said threaded openings 32 and 33 are preferably of the pipe type for connection, respectively, to a nipple 34 (FIGURE 2) and the riser pipe 13. A rubber gasket 31 (FIGURE 3) is disposed between the rim of the cup-shaped portion 22 and the cover plate 24.

Figure 4:
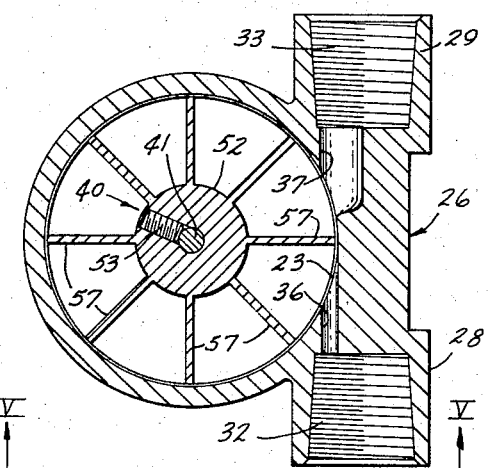
FIGURE 4 is a sectional view taken along the line IV—IV in FIGURE 3.

The connection portion 26 (FIGURE 4) has an inlet passageway 36 which communicates between the inner end of the opening 32 and the recess 23. The inlet passageway 36 is preferably oriented so that its central axis is approximately tangential to the recess 23 and parallel with the axis of said openings 32 and 33. An outlet passageway 37 communicates between the inner end of the threaded opening 33 and the recess 23 and it is also oriented parallel with said axis and substantially tangential to the recess 23. Accordingly, and in the preferred embodiment, the inlet and outlet passageways 36 and 37 are substantially aligned axially and, for reasons appearing hereinafter, the outlet passageway 37 has a larger cross-sectional area throughout its length than the minimum cross-sectional area in the inlet passageway 36.

A rotor 40 is rotatably supported within the recess 23 by means of a shaft 41 to which it is rigidly secured. One end of the shaft 41 (FIGURE 3) is rotatably supported by a bearing 42 disposed within a recess 43 in the end wall 44 of cup-shaped portion 22. The other end of the shaft 41 extends through an opening 46 in the cover plate 24 which acts as the other end wall of the housing 19. Said cover plate 24, which is held in place by screws 47, has an annular recess 48 in its inner surface around the opening 46 for reception of a bearing 49, which engages said shaft 41.

The rotor 40 (FIGURES 3 and 4), in this particular embodiment, has a hub 52 which is secured to the shaft 41 by a set screw 53 which is threadedly received through the hub. Said rotor 40 also has a pair of circular, spaced side plates 54 and 55 between which are disposed a plurality of radially extending vanes 57 which are rigidly secured to the side plates and are uniformly spaced around the hub 52. Due to the above-described arrangement of the inlet passageway 36 and outlet passageway 37, fluid entering through the inlet passageway 36 will impinge upon the peripheral edge portions of the vanes 57, substantially at right angles, thereby causing the rotor 40 to rotate in a substantially conventional manner. A pair of thrust washers 50 encircle the shaft 41 between the rotor 40 and the bearing 49.

A fan 58 of the axial flow type has a hub 59 which is mounted upon the shaft 41 adjacent the cover plate 24 and is secured to said shaft by suitable means, such as the set screw 61. Accordingly, rotation of the rotor 40 effects corresponding rotation of the fan 58. The fan 58 may be of any convenient conventional type designed for moving the maximum amount of air.

Figure 6:
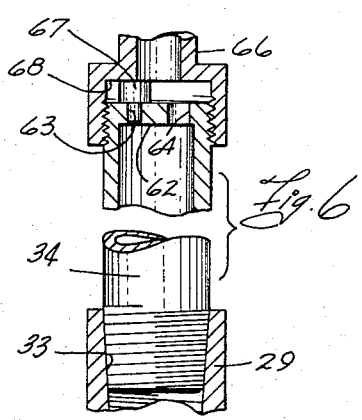
FIGURE 6 is a sectional view taken along the line VI—VI in FIGURE 2.

The upper end of the nipple 34 (FIGURE 6) is covered by an end wall 62 having a pair of openings 63 and 64 therethrough. The upper end of said nipple 34 is externally threaded for threaded engagement by the inlet pipe 66 on the sprinkling head 16. The one opening 63 has a cross-sectional area of approximately the same size as the minimum cross-sectional area of the inlet passageway 36. The other opening 64 has a cross-sectional area which is somewhat larger than the minimum cross-sectional area of the inlet passageway 36. During normal operation of the sprinkling head 16, the opening 63 is closed by a plug 67 which is held in place by the shoulder 68 in the inlet pipe 66, when it is threadedly connected to the nipple 34. However, when it is desirable to provide a greater amount of water, the plug 67 can be removed, so that water can flow through both of the openings 63 and 64.

Although the fan assembly 11 disclosed herein provides for a direct connection between the rotor 40 and the fan 58 through the shaft 41, it will be recognized that said fan 58 could be independently and rotatably supported and connected to said shaft by interconnecting drive means, such as pulleys and belts.

*Operation*

In normal operation, a plurality of the frost preventing devices 10 will be arranged in any given field which they are intended to protect. The fan assemblies can be continuously mounted upon the riser pipe 13, even when the need for air movement is not necessary. In such case, it may be desirable to remove the fan 58 from each motor shaft in order to minimize the obstruction created by the rotor 40 to the flow of water through the hydraulic pump and also to prolong the useful life of the fan. However, when it becomes necessary to use the device 10, it is a simple matter to mount it upon the upper end of the riser pipe 13, or reinstall the fan 58 upon the shaft 41, as the case may be. Usually, a fan assembly 11 will be mounted upon each riser for the purpose of moving air across a field of certain crops, such as strawberries, for example, to insure proper air movement. However, it will be recognized that the fan assemblies can be used with less than all of the riser pipes in a given field, if desired.

Regardless of how many fan assemblies are used, they should all point in the same direction, as indicated by the arrow in FIGURE 1. Moreover, the fan assemblies should be placed close enough together so that they effect a mass movement of the air across the field in the direction of the arrow.

When the water source 18 is connected into the irrigating system 14, the water will move upwardly through each riser pipe and then pass through the inlet passageway 36 so that it impinges upon the outer peripheral portions of the vanes 57 on the rotor 40, whereby the rotor is rotated. Because the outlet passageway 37 and the opening 64 in the end wall 62 are both larger in minimum cross-sectional area than the minimum cross-sectional area of the inlet passageway 36, there will be no abnormal restriction of the water whereby to increase the pressure at the expense of the velocity and the power required to rotate the fan 58. Since the pressure supplied by the source 18 is usually in excess of 50 pounds per square inch, in the average irrigating system, the frictional loss due to the flow of the water through the hydraulic motor 12 and the power loss in rotating the fan 58 are practically negligible. Thus, the movement of the water through the hydraulic motor 12 does not materially affect or reduce the distance which the water is thrown by the sprinkling head 16.

The fan assemblies, when operating, cause the relatively colder air to move through the relatively warmer spray of water whereupon the water gives up heat to the air so that the over-all temperature of the water and air is sufficiently above freezing to prevent the crops from freezing. That is, since the air adjacent the ground is moving constantly, there is no chance for the cold upper air to move down through the blanket of moving warmer air and water to frost the crops.

Although a particular preferred embodiment of the invention has been described above in detail for illustrative purposes, it will be recognized that variations or modifications which come within the scope of the appended claims, are fully contemplated.

The embodiments of the invention in which an exclusive property or privilege is claimed are defined as follows:

1. A frost prevention device connectible to a source of water under pressure, comprising:
   a hydraulic motor having inlet orifice means, outlet orifice means, shaft means and a vane-type rotor connected to said shaft means;
   first and second conduit means connected to said inlet and outlet orifice means, said first conduit means being connected to said source and arranged for supporting said motor in a position where said shaft rotates around a substantially horizontal axis;
   nozzle means connected to said second conduit means, said second conduit means communicating with said outlet orifice and the minimum size of said outlet orifice being larger than the minimum size of said inlet orifice, said nozzle means having a discharge opening not smaller than said size of said inlet orifice means; and
   axial flow fan means mounted upon said shaft means for rotation therewith, said fan means being near said nozzle means.

2. A device according to claim 1, wherein said inlet and outlet orifices are substantially aligned and such alignment is substantially tangential to said rotor; and wherein said nozzle means is arranged to rotate around an axis transverse of said shaft means and substantially parallel with the alignment of said orifices.

3. A frost prevention device according to claim 1, wherein said source of water under pressure includes a plurality of upright riser pipes uniformly spaced at relatively close intervals; and wherein a plurality of hydraulic motors are mounted one each upon said riser pipes in communication therewith, each hydraulic motor supporting and driving an axial flow fan means for rotation around substantially parallel and horizontal axes.

References Cited by the Examiner

UNITED STATES PATENTS

| 661,898 | 11/1900 | Tucker | 47—2 |
| 1,111,993 | 9/1914 | Carder | 47—2 |
| 3,123,304 | 4/1964 | Sutton | 239—77 |

ABRAHAM G. STONE, *Primary Examiner.*

ROBERT E. BAGWILL, *Examiner.*